B. C. SABIN.
CULINARY APPLIANCE.
APPLICATION FILED JULY 18, 1919.
1,335,530.
Patented Mar. 30, 1920.
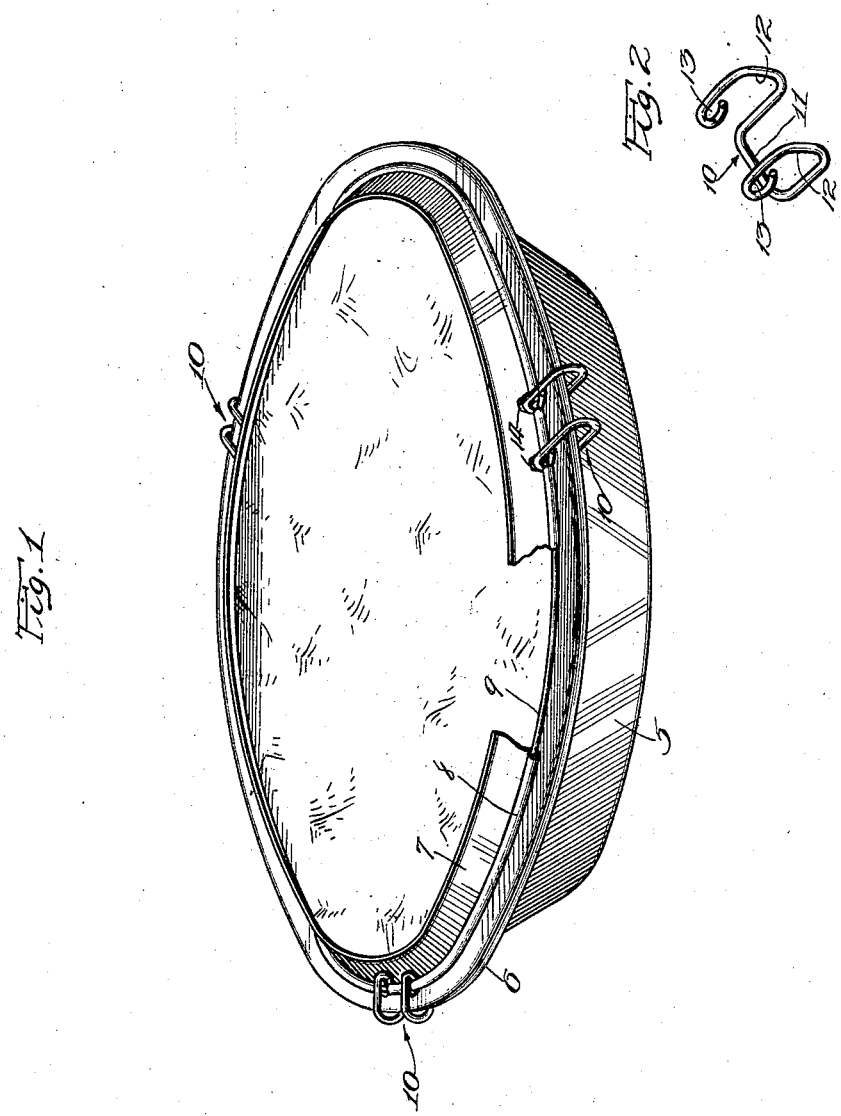
Witness:
Harry S. Gaither
Inventor:
Belle C. Sabin

UNITED STATES PATENT OFFICE.

BELLE C. SABIN, OF CHICAGO, ILLINOIS.

CULINARY APPLIANCE.

1,335,530.   Specification of Letters Patent.   Patented Mar. 30, 1920.

Application filed July 18, 1919. Serial No. 311,784.

*To all whom it may concern:*

Be it known that I, BELLE C. SABIN, a citizen of the United States, residing at Chicago, in the county of Cook and State of Illinois, have invented certain new and useful Improvements in Culinary Appliances, of which the following is a specification.

This invention relates to a device that is adaptable for use with culinary dishes, such as pie pans, its primary purpose being to provide a clamp that bears down upon the dish edge around its entire periphery to prevent any loss or spilling of materials therein during the operation of cooking. Inasmuch as the present device is particularly adapted for use with pie tins, although not necessarily confined to such use, the description to follow will refer to it only in this relation.

A simple suggestive embodiment of my invention is shown in the accompanying drawing—

Figure 1 being a perspective view of the device as applied to a pie tin; and

Fig. 2 a detail of one of the clips disassociated from the device.

For purposes of exemplification, I have illustrated in the drawing a pie tin 5 having the usual outwardly turned flange or rim 6. Applied to the tin so formed is the device of my invention comprising a circular wall 7, which may conveniently be formed of sheet metal, having its lower edge turned as at 8 in encircling relation to a wire frame 9. At intervals around the frame clips 10 are arranged, a preferred form, best shown in Fig. 2, comprising a wire bent to provide a main U-shaped hooking portion 11 whose ends are each turned in parallel relation to form other U-shaped connecting portions 12, the ends of which are each looped as at 13 to provide an eye adapted to encircle the wire frame 9 through suitable openings 14 formed, as required, in the wall 7.

The appliance that has been described is a unitary structure with all its parts maintained securely in place. In the application of this device to a pie tin in which the crusts and pie filling are contained, the device is laid upon the rim 6, which is, of course, overlaid by the crusts, it being desirable that the wire frame 9 should be of proper diameter for this purpose. The clips 10 are then turned down and around the rim to present their lower hooking portions 11 beneath the rim by which action the appliance is securely clamped in place. It will be noted that a pressure is placed upon the pie crusts adjacent their peripheries, and that the wall 7 acts as a retainer to prevent any overflow of juices or other material which may be puffed out through the crusts. After the baking operation the appliance may be readily removed from the tin preparatory to taking out the pie.

Not only is the present appliance advantageous for the reasons already mentioned, but it is essentially simple in its construction and operation, and requires but slight expense for its production. It is not liable to get out of order, nor will it soon wear out in service. Obviously it may be embodied in other forms than the one shown and described herein, and any changes or modifications which retain the essential features of this invention, as defined in the claims below, are to be deemed as within the scope of this patent.

I claim:

1. An appliance of the kind described consisting of a wire frame adapted to lie adjacent the edge of a dish, clips swingingly secured to the frame and arranged to engage with the rim of the dish, and a wall carried by the frame upstanding therefrom to a point above the edge of the dish and formed to provide a clearance for movement of the clips, substantially as described.

2. In an appliance of the kind described, the combination of a circular frame, a circular wall having one edge thereof turned around upon the frame to lock therewith, the wall being apertured at intervals adjacent the frame, and clips swingingly secured to the frame through the apertures in the wall, the clips being adapted to secure the appliance to a dish, substantially as described.

BELLE C. SABIN.

Witness:
JOHN J. PHELAN.